United States Patent
Mofakhami et al.

(10) Patent No.: US 9,105,907 B2
(45) Date of Patent: Aug. 11, 2015

(54) MATERIAL FOR AN ELECTROCHEMICAL DEVICE

(75) Inventors: Arash Mofakhami, Buthiers (FR); Jean-François Fauvarque, Paris (FR)

(73) Assignee: CERAM HYD, Avon (FR)

( * ) Notice: Subject to any disclaimer, the term of this patent is extended or adjusted under 35 U.S.C. 154(b) by 251 days.

(21) Appl. No.: 12/920,588

(22) PCT Filed: Mar. 4, 2009

(86) PCT No.: PCT/FR2009/050352
§ 371 (c)(1),
(2), (4) Date: Dec. 15, 2010

(87) PCT Pub. No.: WO2009/115732
PCT Pub. Date: Sep. 24, 2009

(65) Prior Publication Data
US 2011/0091789 A1 Apr. 21, 2011

(30) Foreign Application Priority Data
Mar. 6, 2008 (FR) ..................... 08 51454

(51) Int. Cl.
*H01M 8/10* (2006.01)
*H01M 4/88* (2006.01)
(Continued)

(52) U.S. Cl.
CPC ............... *H01M 2/1646* (2013.01); *C25B 1/02* (2013.01); *C25B 11/04* (2013.01); *C25B 13/04* (2013.01); *H01M 2/145* (2013.01); *H01M 2/166* (2013.01); *H01M 2/1673* (2013.01); *H01M 4/0411* (2013.01); *H01M 4/38* (2013.01); *H01M 4/383* (2013.01); *H01M 4/622* (2013.01); *H01M 4/8652* (2013.01); *H01M 4/8668* (2013.01); *H01M 4/8864* (2013.01); *H01M 4/905* (2013.01); *H01M 4/9058* (2013.01); *H01M 8/0215* (2013.01); *H01M 8/0226* (2013.01); *H01M 8/065* (2013.01); *H01M 8/1016* (2013.01); *H01M 8/1097* (2013.01); *H01M 8/124* (2013.01); *H01M 8/1226* (2013.01); *H01M 8/1286* (2013.01); *C01B 21/064* (2013.01); *Y02E 60/521* (2013.01); *Y02E 60/525* (2013.01)

(58) Field of Classification Search
None
See application file for complete search history.

(56) References Cited

U.S. PATENT DOCUMENTS

| | | | |
|---|---|---|---|
| 4,146,446 | A | 3/1979 | Von Sturm |
| 4,737,249 | A | 4/1988 | Shepard, Jr. et al. |
| 4,795,617 | A | 1/1989 | O'Hare |
| 5,205,911 | A | 4/1993 | Kawolics et al. |
| 5,270,126 | A | 12/1993 | Aoki |

(Continued)

FOREIGN PATENT DOCUMENTS

| | | |
|---|---|---|
| EP | 1 400 986 A1 | 3/2004 |
| FR | 2 871 478 A1 | 12/2005 |

(Continued)

OTHER PUBLICATIONS

Kojima, Y., et al., "Hydrogen storage of metal nitrides by a mechanochemical reaction," *Journal of Power Sources*, 2006, vol. 159, pp. 81-87.

(Continued)

*Primary Examiner* — Barbara Gilliam
*Assistant Examiner* — Robert S Carrico
(74) *Attorney, Agent, or Firm* — Jones Robb, PLLC (57) ABSTRACT

The present invention relates to a material for an electrochemical device, especially a fuel cell, an electrolyzer or a storage battery, comprising a matrix and activated boron nitride contained in the matrix.

14 Claims, 5 Drawing Sheets

(51) Int. Cl.
| | |
|---|---|
| *H01M 2/16* | (2006.01) |
| *H01M 4/04* | (2006.01) |
| *H01M 4/139* | (2010.01) |
| *H01M 4/58* | (2010.01) |
| *H01M 4/62* | (2006.01) |
| *H01M 4/86* | (2006.01) |
| *C25B 1/02* | (2006.01) |
| *C25B 11/04* | (2006.01) |
| *C25B 13/04* | (2006.01) |
| *H01M 2/14* | (2006.01) |
| *H01M 4/38* | (2006.01) |
| *H01M 4/90* | (2006.01) |
| *H01M 8/02* | (2006.01) |
| *H01M 8/06* | (2006.01) |
| *H01M 8/12* | (2006.01) |
| *C01B 21/064* | (2006.01) |

(56) References Cited

U.S. PATENT DOCUMENTS

| | | | | |
|---|---|---|---|---|
| 5,935,727 | A  * | 8/1999 | Chiao | 429/465 |
| 6,306,358 | B1 * | 10/2001 | Yamamoto | 423/290 |
| 6,638,413 | B1 | 10/2003 | Weinberg et al. | |
| 6,864,011 | B2 | 3/2005 | Kawahara et al. | |
| 2002/0100682 | A1 | 8/2002 | Kelley et al. | |
| 2004/0140201 | A1 | 7/2004 | Horikawa | |
| 2005/0016866 | A1 | 1/2005 | Kramer et al. | |
| 2005/0072334 | A1* | 4/2005 | Czubarow et al. | 106/270 |
| 2006/0194096 | A1 | 8/2006 | Valle et al. | |
| 2006/0237688 | A1 | 10/2006 | Zimmerman | |
| 2007/0119718 | A1 | 5/2007 | Gibson et al. | |
| 2007/0134536 | A1* | 6/2007 | Takase et al. | 429/35 |
| 2007/0178384 | A1 | 8/2007 | Kajita et al. | |
| 2008/0160359 | A1 | 7/2008 | Mofakhami | |
| 2010/0089767 | A1 | 4/2010 | Mofakhami | |
| 2010/0279201 | A1 | 11/2010 | Mofakhami | |
| 2010/0280138 | A1 | 11/2010 | Mofakhami | |
| 2011/0091789 | A1 | 4/2011 | Mofakhami et al. | |

FOREIGN PATENT DOCUMENTS

| | | |
|---|---|---|
| FR | 2 916 906 A1 | 12/2008 |
| WO | WO 96/07623 A1 | 3/1996 |
| WO | WO 00/45457 A2 | 8/2000 |
| WO | WO 02/41432 A1 | 5/2002 |
| WO | WO 03/062152 A1 | 7/2003 |
| WO | WO 2004/067611 A1 | 8/2004 |
| WO | WO 2005/005691 A1 | 1/2005 |
| WO | WO 2006/003328 A1 | 1/2006 |
| WO | WO 2008/129182 A2 | 10/2008 |
| WO | WO 2008/148956 A1 | 12/2008 |
| WO | WO 2008/148957 A1 | 12/2008 |
| WO | WO-2009/115732 A1 | 9/2009 |

OTHER PUBLICATIONS

International Search Report for International Patent Application No. PCT/FR2008/050381 dated Sep. 12, 2008.
Written Opinion of the International Search Authority for International Patent Application No. PCT/FR2008/050381.
International Search Report for International Patent Application No. PCT/FR2008/050380 dated Sep. 11, 2008.
Written Opinion of the International Search Authority for International Patent Application No. PCT/FR2008/050380.
International Search Report for International Patent Application No. PCT/FR2009/050352 dated Aug. 26, 2009.
Written Opinion of the International Search Authority for International Patent Application No. PCT/FR2009/050352 dated Aug. 26, 2009.
International Search Report for International Patent Application No. PCT/FR2008/050379 dated Jan. 22, 2009.
Written Opinion of the International Search Authority for International Patent Application No. PCT/FR2008/050379 dated Jan. 22, 2009.
Office Action dated May 3, 2012 from U.S. Appl. No. 12/529,292.
Office Action dated Oct. 3, 2012 from U.S. Appl. No. 12/529,292.
Response to Office Action dated May 3, 2012 from U.S. Appl. No. 12/529,292.
Response to Office Action dated Oct. 3, 2012 from U.S. Appl. No. 12/529,292.
Office Action dated Mar. 15, 2012 from U.S. Appl. No. 12/602,116.
Response to Office Action dated Mar. 15, 2012 from U.S. Appl. No. 12/602,116.
Notice of Allowance dated Oct. 30, 2012 from U.S. Appl. No. 12/602,116.
Supplemental Notice of Allowance dated Nov. 16, 2012 from U.S. Appl. No. 12/602,116.
Comments on Statement of Reasons for Allowance dated Jan. 29, 2013.
Restriction Requirement dated Apr. 26, 2012 from U.S. Appl. No. 12/602,135.
Response to Restriction Requirement dated Apr. 26, 2012 from U.S. Appl. No. 12/602,135.
Office Action dated Aug. 8, 2012 from U.S. Appl. No. 12/602,135.
Response to Office Action dated Aug. 8, 2012 from U.S. Appl. No. 12/602,135.
Notice of Allowance dated Apr. 24, 2013 from U.S. Appl. No. 12/602,135.
Office Action dated Nov. 4, 2013 from U.S. Appl. No. 12/529,292.
Chen et al., "Enhancing bonding strength between CBN grits and plating layer with surface activation technique," Diamond and Abrasives Engineering, Apr. 2006, 4 pages, Serial 152, No. 2, The State Education Ministry Key Laboratory of Advanced Ceramics & Machining Technology, Tianjin, China.
Office Action for Chinese Application No. 2008800178882, dated Nov. 15, 2013.
Machine-prepared English language translation of Office Action for Chinese Application No. 2008800178882, dated Nov. 15, 2013.

* cited by examiner

MATERIAL FOR AN ELECTROCHEMICAL DEVICE

This is a national stage application of PCT/FR2009/050352, filed internationally on Mar. 4, 2009.

The present invention relates to materials used for the preparation of a proton-exchange membrane comprising boron nitride, intended for the manufacture of electrolyzers, fuel cells and/or accumulators and in general any electrochemical device using ion-selective membranes.

WO 2006/003 328 discloses the use of a boron nitride ceramic for producing a collision between protons and electrons and storing hydrogen.

Nafion® (from Dupont de Nemours) is commonly used for producing membranes for fuel cells, for instance in patent application NC 2004/067 611. This material has the drawback of being very expensive and may become destructured at a working temperature of greater than 80° C. under normal conditions.

There is thus a need to benefit from a material, which may be less expensive, and which may be used at temperatures of up to 200° C., for example about 95° C., better still 120° C., or even 150° C., or even 180° C.

The invention is especially directed toward proposing a novel material for electrochemical devices, especially fuel cells, electrolyzers or accumulators, which can afford good mechanical and thermal stability and which can especially function at a relatively high temperature just as at room temperature.

According to one of its aspects, one subject of the invention is a material for an electrochemical device, especially a membrane for a fuel cell, comprising a matrix and activated boron nitride contained in the matrix.

According to one of its aspects, one subject of the invention is a material for an electrochemical device, especially a membrane for an electrolyzer, comprising a matrix and activated boron nitride contained in the matrix.

The material comprising activated boron nitride may be used to manufacture a fuel cell, an accumulator, an electrodialysis device, a redox system for storing electrical energy, a chlorine-sodium hydroxide electrolyze or ion-selective electrodes.

Activation of Boron Nitride

The term "activation of boron nitride" means a process for promoting proton conduction in boron nitride. In activated boron nitride, the number of B—OH, NH, B—SO$_4$H, B—SO$_3$H, N—SO$_4$H and N—SO$_3$H bonds formed is sufficient to allow the displacement of a proton from a group B—OH or BSO$_x$H or from a group NH or N—SO$_x$H toward a lone pair of electrons on a neighboring oxygen or nitrogen, or on a group OH or NH forming groups $NH_2^+$, $BOH_2^+$, B—SO$_x$H$_2^+$ or N—SO$_x$H$_2^+$.

Proton conduction may also be performed by means of lone pairs on oxygen atoms inserted into nitrogen holes of the boron nitride. Such nitrogen holes containing oxygen atoms may especially be present when the boron nitride is obtained from $B_2O_3$ or from $H_3BO_3$.

Activated boron nitride may comprise B—OH, N—H, B—SO$_4$H, B—SO$_3$H, N—SO$_4$H and N—SO$_3$H bonds capable of being converted into $BOH_2^+$, $NH_2^+$, B—SO$_x$H$_2^+$ and N—SO$_x$H$_2^+$, thus allowing proton transfer via these sites created by means of the activation.

Boron nitride may be in the form of grains stuck together, for example percolated or sintered. The term "percolated" refers to grains that are physically touching.

The material may comprise percolated grains of boron nitride, for example maintained solidly attached to each other by means of a matrix comprising a compound, for example a compound from the following list: nickel, boron oxide, calcium borate, ethyl cellulose, boric acid, polyvinyl alcohol (PVA), vinylcaprolactam, PTFE (Teflon®), sulfonated polyether sulfone, this not being limiting.

The mass proportion of boron nitride in the material may be between 5% and 100%, for example up to 70%. The material may be made entirely of boron nitride powder sintered at high pressure. As a variant, it may comprise boron nitride and a binder, being manufactured, for example, via an HIP (Hot Isostatic Pressure, high-pressure isostatic compression) process.

The boron nitride used may comprise at least one, for example one or more, substituent components from the following list: boron oxide, calcium borate, boric acid, hydrofluoric acid.

The presence of such components may make it possible promote activation, especially when they are present in a mass proportion of between 1% and 10%.

The presence of boric acid, for example present in the porosities of the boron nitride or in amorphous form, may make it possible to promote the creation of B—OH and NH bonds.

The material may comprise a mineral matrix, for example comprising active charcoal or graphite, or alternatively boric acid.

As a variant, the material may comprise organic matrix, for example comprising at least one of the compounds from the following list: polymer, fluorinated polymers, PVA, epoxy resin, cellulose-based compounds. The material may be formed by boron nitride, for example pulverulent, inserted, especially dispersed, in a polymer matrix, which may afford the material very good proton conductivity.

The polymer, for example PVA, may be used for plugging the porosities present in the boron nitride. The addition of polymer may be performed, for example, under vacuum, such that this polymer is sucked into the porosities of the boron nitride.

The matrix may be made, for example, from a matrix precursor that can be polymerized under the action of a stimulus, for example by evaporation of one or more solvents, by a temperature increase or by applying γ radiation.

By way of example, PVA may be used in the matrix, by wetting this mixture and then introducing the boron nitride. A crosslinking agent is then added, for example glutaraldehyde, and a crosslinking catalyst, for example acid, and the PVA is finally hot-crosslinked at 40° C. The PVA may preferably be hot-crosslinked and immersed in a bath of acid. A BN membrane in a PVA matrix with a conductivity of $10^{-1}$ S/cm may thus be obtained.

The matrix may itself be a proton conductor or, on the contrary, may not be a proton conductor.

The matrix may comprise at least one of an organic material and an inorganic material.

The matrix may comprise one or more of the compounds from the following list, which is not limiting: inorganic compound, for example silica, for example in the form of Aerosil®, grafted silica, fumed amorphous silica, organic silica with a thiol group, silica with a phosphonic acid function, silica with surface-anchored sulfonic acid, alumina, zirconia, sulfated zirconia, titanium oxide, sulfonated titanium oxide, tungsten trioxide, tungsten trioxide hydrate, heteropolyacid, for example polytriacetylene (PTA), polymethacrylic acid (PTA), STA, SMA, tungstophosphoric acid (TPA), molybdophosphoric acid (MBA), disodium salt of tungstophosphoric acid (Na-TPA), phosphomolybdic acid (PMA), hole heteropolyacid $H_8SiW_{11}O_{39}$, functionalized sulfonic heteropolyacid, PWA, silicotungstic acid, PTA supported on $SiO_2$, $ZrO_2$ and $TiO_2$, MCM-41 charged heteropolyacid, mesoporous tungsten silicate material SI-MCM-41, heteropolyacid charged with Y-zeolite, silicotungstic acid, zirconium phosphate, zirconium sulfophenyl phosphate (ZR-SPP), hydrogenated zirconium phosphate $Zr(HPO_4)_2$, zirconium tricarboxybutyl phosphonate, zirconium sulfophenylene phosphonate, $Zr(HPO_4)_{10}$ $(O_3PC_6H_4SO_3H)_{10}$, zirconium sulfophenylene phosphonate phosphate, sulfonated zirconium phosphate, cesium salt of silicotungstic acid, silicated multilayer nanoparticles, for example montmorillonite, laponite, modified montmorillonite, for example sulfonated montmorillonite, MCM-41, organic montmorillonite (OMMT), montmorillonite grafted with organic sultones and with perfluorinated sultones, phosphosilicates ($P_2O_5$—$SiO_2$), phosphoantimonic acid, noble metals, for example platinum, ruthenium, platinum silicate coated with Nafion®, silver, zeolite, chabasite and clinoptylolite, mordonite, phosphate, calcium phosphate, calcium hydroxyphosphate, boron phosphate organic compound, polymer, Nafion®, perfluorosulfonic acid, sulfonated polysulfone, PEO, PTFE, polyaniline, poly(vinylidene)fluoride-chlorotetrafluoroethylene, PEG, DBSA, 4-dodecylbenzenesulfonic acid, SEEPS (sulfonated styrene, sulfonated styrene-(ethylene-butylene)), PVA, glutaraldehyde, krytox, diphenyl silicate, diphenyl dimethoxysilicate, sulfonated poly(ether sulfone), PVDF, Nafion® membrane NRE-212, $Cs_{2.5}H_{0.5}PWO_{40}$, PVDF-G-PSSA, polyvinylidene fluoride, polyacrylonitrile, dodecatungstophosphoric acid, sulfonated (poly)ether ether ketone (SPEEK), PEO, sulfonated (poly(arylene ether sulfone), polyvinyl alcohol, PEEK (s-polyether ether ketone), cardo sulfonated polyether sulfone, polyphenylene oxide (PPO), polyethylene glycol, silica nanoparticles, divacant tungstosilicate $[\gamma\text{-}SiW_{10}O_{36}]^{8-}$, PWA, PBI, PEG, polyethyleneimine (PEI), disulfonated poly(arylene ether sulfone), Teflon®, sulfonated divinylbenzene (crosslinked DVB), polystyrene-grafted poly(ethylene-alt-tetrafluoroethylene), poly(vinyl difluoride), polybenzimidazole, PVDF, cardo sulfonated poly (ether ether ketone), poly(fluorinated arylene ether)S, Nafion®115, polyimide, polyamideimide (PAI), polyvinylidene fluoride (PVDF), styrene-ethylene-butylene-styrene elastomer (SEVS), poly(sulfonated biphenyl ether sulfone), polytetrafluoroethylene (PTFE), PBI.

The boron nitride may be activated during or at the end of the membrane manufacturing process.

The production of a membrane with boron nitride may be obtained, for example, via one or other of the following two processes: the first process consists in manufacturing a membrane by high-temperature sintering of a "raw" membrane prepared according to the usual methods for manufacturing ceramic objects. The second process consists in preparing a membrane by incorporating boron nitride powder into an organic matrix serving as binder, while ensuring percolation between the grains of boron nitride.

For example, for the first process, boron nitride grains are mixed with a polymeric binder in liquid form, this mixture being poured onto a substrate, and than heated to a sufficient temperature so as to cause calcination of the binder, for example at a temperature of about 600 or 700° C., such that the boron nitride grains are mutually percolated on the substrate.

In an additional step, the result obtained is heated to a temperature of about 1000-1500° C. under a neutral atmosphere, for example of nitrogen, ammonia or argon, causing mutual sintering of the grains.

Finally, in an additional step, the substrate is removed to give a rigid sheet of boron nitride composed of sintered grains, for example between 50 μm and 300 μm thick. Activation is performed after sintering, avoid the risk of it being destroyed by the sintering.

In another embodiment, it is also possible to incorporate the pulverulent boron nitride into a molten inorganic binder, for example boric acid. The activation may be performed under an atmosphere of steam maintained at high temperature. The temperature may be, for example, less than 600° C., or even less than 500° C., better still less than 400° C., or even about 300° C.

The material may have sufficient mechanical cohesion to allow it to be formed into a membrane, for example of between 50 μm and 300 μm thick.

According to the second process, the boron nitride may be activated in its pulverulent form before insertion into the matrix, for example into a polymer, or alternatively after insertion into the matrix, for example as a function of the matrix used.

The material may be used in the form of a membrane whose tensile strength, between 20° C. and 180° C., is defined by an elastic modulus. The elastic modulus of a BN membrane with a crosslinked PVA matrix may be, for example, between $10^9$ Pa and $10^8$ Pa.

The matrix may be water-insoluble. The term "insoluble" should be understood as meaning that, after remaining for 600 seconds at 80° C. in water, less than $10^{-2}$% of the membrane passes into solution, even in the presence of an electric field, for example an electric field of greater than 11 000 V/m, i.e. a voltage of about 2.2 V applied to a membrane about 200 μm thick. The amount of boron nitride passed into solution may be less than $10^{-3}$ mg/l.

The boron nitride may be in the form of grains stuck together, for example percolated or sintered. The term "percolated" should be understood as referring to grains that are physically touching.

Commercially available boron nitride is electrically and ionically insulating.

According to another of its aspects, a subject of the invention is also an extruded, screen-printed film, membrane film alone or with its electrodes, which is made or which may be made from the material as defined above.

According to another of its aspects, a subject of the invention is also a proton-exchange membrane for an electrochemical device, especially a fuel cell, an electrolyzer or an accumulator, comprising a layer of the material as defined above.

According to another of its aspects, a subject of the invention is also a process for manufacturing such a membrane for fuel cell or other applications, especially electrolyzer or accumulator, in which the membrane is exposed to an acidic solution and then rinsed.

Exposure of the membrane to acid may advantageously be performed under an electric field of between 15 and 40 000 V/m, or even of about 15 000 V/m, which may improve the activation efficacy. A field of 15 000 V/m is equivalent to applying 1.5 V for a boron nitride thickness of 100 μm or 15 V for a thickness of 1 mm. The field may be at least 15 000 V/m, i.e. a voltage of about 3 V is applied to a membrane 200 μm thick.

Total impermeability of the wall during the storage production may make it possible to store within the electrode, for example the cathode, the formed atomic and/or molecular hydrogen. The adsorption of hydrogen necessary for this purpose may depend on the nature of the electrode, for example the cathode. Specifically, the presence of water in the electrode, for example the cathode, may give rise to the risk of preventing the establishment of molecular contact in the electrode, for example the cathode, thus preventing the establishment of satisfactory electrical conduction, and thus preventing the formation of hydrogen in the electrode, for example the cathode, or at the interface. On the other hand, the presence of water at the interface of the electrode and the proton-exchange membrane may have no consequence on the system. Specifically, water behaves like the continuity of the ion-permeable wall due to its ion-conducting power. Moreover, insofar as close to the electrode the medium is reductive by virtue of the presence of hydrogen, the presence of water is not an inconvenience for the storage.

At least one electrode, for example the anode, may be made with any electrically conductive material that is compatible with the $H^+$-ion donor, for example platinum, graphite, a thin layer of a mixture of $RuO_2$, $IrO_2$ or $RuO_2$, $IrO_2$ and $TiO_2$ or $RuO_2$, $IrO_2$ and $SnO_2$ lined with a plate of porous titanium (for example 30% to 50%) or a conductive polymers inter alia. The thin layer may have a thickness of between 5 μm and 20 μm, for example about 10 μm.

According to another of its aspects, a subject of the invention is also an electrode for an electrochemical device, especially a fuel cell, made at least partially of the material as defined above. The electrode may be, for example, a cathode or an anode. The material in accordance with the invention may be metallized before activation.

At least one of the electrodes, for example the cathode, may comprise activated boron nitride and active charcoal or graphite. Said electrode, for example the cathode, may be embedded in a mass of boron nitride. The electrode may comprise, for example, a metal foam or any conductive material, for example active charcoal or graphite, embedded in a mass of boron nitride.

At least one of the electrodes, for example the anode, may comprise, for example, a thin layer of a mixture of $RuO_2$, $IrO_2$ or $RuO_2$, $IrO_2$ and $TiO_2$ or $RuO_2$, $IrO_2$ and $SnO_2$ lined with a plate of porous titanium (for example 30% to 50%). The thin layer may have a thickness of between 5 μm and 20 μm, for example about 10 μm.

One or other of the electrodes may be made in a pulverulent form, being sprayed onto the membrane formed by the layer of boron nitride mentioned above. After spraying, this layer may be compressed in a press at a pressure of between 5 and 40 kg/m², for example about 20 g/m², at a temperature of between 15° C. and 200° C., for example between 25° C. and 150° C., to improve the adhesion of the electrodes to the membrane. The temperature depends on the nature of the layer, depending, for example, on whether or not it comprises a polymer that is sensitive to the applied maximum temperature.

According to another of its aspects, a subject of the invention is also a cell of a fuel cell, an electrolyzer or an accumulator comprising:
 a cathode, and
 a proton-exchange membrane, at least one from among the cathode and the membrane comprising, or even being formed from, the material as defined above, especially the proton-exchange membrane.

The cell may also comprise an anode. The cathode of the cell may be as defined above. As a variant, one or both of the electrodes, anode and/or cathode, may comprise at least one of the compounds of the following list, which is not limiting: platinum, for example in the form of nanograins, active charcoal, a binder, for example ethanol or a polymeric compound, for example PTFE, or alternatively a mixture of these components. One or other of the electrodes may be made in a pulverulent form, being sprayed onto the proton-exchange membrane.

In another embodiment, the entire outer surface of the cathode may be covered with a material comprising boron nitride, for example activated boron nitride. The cathode may be immersed in boron nitride, which may be pulverulent. The cathode may be rolled upon itself, in a spiral form.

The cell may be of cylindrical general shape, the proton-exchange membrane constituting a cylindrical envelope surrounding the cathode.

The proton-exchange membrane may be impermeable to hydrogen. The term "impermeable" should be understood as meaning that an amount of hydrogen of less than 2% can cross a membrane 150 μm thick. The proton-exchange membrane may be non-porous. The term "non-porous" should be understood as meaning that less than 2% of gas can cross a membrane 150 μm thick. The proton-exchange membrane may have a nonzero surface porosity.

At least one of the electrodes, for example the anode, may comprise at least one layer of a metallic compound in contact with the proton-exchange membrane. The metallic compound may be chosen from: platinum, gold, nickel, and alloys thereof.

One or both of the electrodes, anode and/or cathode, may be as defined above. One or both of the electrodes, anode and/or cathode, may comprise, for example, at least one of the compounds from the following list, which is not limiting: platinum, for example in the form of nanograins, boron nitride, especially activated boron nitride as mentioned below, active charcoal, a binder, for example ethanol or a polymeric compound, for example PVA or PTFE, or alternatively a mixture of these components.

The thickness of the proton-exchange membrane may be less than or equal to 1 mm, for example being between 50 μm and 300 μm.

The cell may also comprise a support substrate for the proton-exchange membrane. The substrate may be chosen from: alumina, zirconia, porous boron nitride, and mixtures thereof.

The substrate may comprise, for example, a grille, one or more yarns, a foam, a film or a plate, for example, a pierced plate. The substrate may comprise, for example, a thin woven, made of a polymer, for example polyamide, for example Nylon®.

According to one of its aspects, a subject the invention is also an electrolyzer comprising a defined above.

According to one of its aspects, a subject of the invention is also a fuel cell comprising a cell as defined above, and also a circuit for conveying a fuel on the cathode side and a circuit for conveying an oxidant on the anode side.

The fuel may be hydrogen gas. The oxidant may be air or oxygen. The hydrogen intended to feed the cell may be stored in hydride form in the material defined above.

The use of the electrolyzer or of the fuel cell in accordance with the invention may be performed at relatively high temperatures, for example of about 80° C. for the electrolyzer and 150° C. for the fuel cell.

According to one of its aspects, a subject of the invention is also a process for activating a material for an electrochemical device, comprising a matrix and boron nitride contained in the matrix, in which the material is exposed to a fluid for providing hydroxyl radicals —OH and/or $H_3O^+$ or $SO_4^{2-}$ ions and for creating in the boron nitride B—OH and/or B—$SO_4H$, B—$SO_3H$, N—$SO_4H$, N—$SO_3H$ and/or NH bonds.

For this activation, the boron nitride, or the membrane, may be exposed to a fluid for providing $H_3O^+$ or $SO_4^{2-}$ ions and for creating in the boron nitride B—OH and/or B—$SO_4H$, B—$SO_3H$, N—$SO_4H$, N—$SO_3H$ and/or NH bonds. The fluid may be, for example, an acidic solution containing $H_3O^+$ ions, for example strong acids such as HCl, $H_2SO_4$, $H_3PO_4$, $H_2S_2O_7$, or weak acids, for example in the presence of an electric field, or alternatively may not be an acidic solution, but, for example, a basic solution containing $OH^-$ ions, for example a sodium hydroxide or potassium hydroxide solution. The concentration of the solution may have an influence on the rate and level of activation obtained, i.e. on the level of proton conductivity obtained, but not on the onset of activation itself. The acid concentration may be, for example, between 1 and 18 mol/L and the sodium hydroxide concentration may be between 0.5 and 1 mol/L.

In order to promote the creation of B—OH, B—OH, B—$SO_3H$, N—$SO_4H$, N—$SO_3H$ and/or NH bonds, the membrane containing the boron nitride may be subjected to an electric field, for example an electric field of between 15 and 40 000 V/m, or even of about 15 000 V/m, in the presence of a 1 molar $H_2SO_4$ solution, for example. A field of 15 000 V/m is equivalent applying a voltage of 1.5 V for a material thickness 100 μm or alternatively 15 V for a thickness of 1 mm.

The electric field may be delivered by an external generator.

The applied voltage may be, for example, between 1.5 V and 50 V, for example about 30 V. The voltage source may be constant or, as a variant, inconstant. It may be configured to detect the end of activation automatically, for example when the current density in the material increases abruptly. The intensity of the current circulating during activation in the material may be from about 10 mA/cm² to 1000 mA/cm².

The electrodes used, cathode and anode, may be made, for example, of platinum, or of platinized titanium at the cathode and of titanium with $IrO_2$ at the anode. The electrodes may be, for example, of planar or, as a variant, nonplanar shape. They may b, for example, in the form of a sinter.

The presence of an electric field may make it for example, to overcome the natural hydrophobicity of boron nitride. Dihydrogen may be produced at the cathode during the activation, followed by dioxygen at the anode. The dihydrogen formed at the cathode and the dioxygen formed at the anode may be recovered in reservoirs.

The fluid may be forced to circulate through the boron nitride, for example by means of a pump.

The activation with a fluid may be performed at temperature of between 0 and 90° C., for example about 60° C., or even at room temperature.

The boron nitride may be activated in a basic solution, for example sodium hydroxide, with or without application of an electric field.

After having been exposed to the solution, the boron nitride may be rinsed and optionally dried before being used to manufacture a fuel cell, an electrolyzer or an accumulator. The fluid may be removed such that its residual content is less than 2%.

The step of exposure to the fluid may have a duration of between 10 and 50 hours, or even between 15 and 72 hours and better still, for example, between 10 and 40 hours, and even better still between 10 and 20 hours.

Boron Nitride

The boron nitride used may preferably be crystallized in a hexagonal form. The material may, for example, comprise turbostratic boron nitride, i.e. boron nitride in which the crystallization planes may be slightly offset relative to the theoretical position of crystallization, for example hexagonal crystallization of the boron nitride, which leads to staggering of the stacks of planes and poorer maintenance of planes to each other, these planes being slightly more separated.

The material may comprise hexagonal boron nitride grains stuck together, for example grains with a median size of greater than 1 nm, or even greater than 10 nm, or even greater than 5 μm, and less than 20 μm. The boron nitride may be in the form of grains, for example with a median size of between 5 and 15 μm, or even between 7 and 11 μm, or even of about 10 μm. The grains may themselves be composed of crystallites with an average size of between 0.1 and 0.5 μm.

When the material is in the form of a layer, the boron nitride grains may preferably be oriented not all parallel to the layer, but, for example, perpendicular to it, so as to ensure better mechanical strength, or alternatively heterogeneously, so as to ensure better proton conduction of the material.

Matrix

The matrix may comprise percolated boron nitride grains, for example grains solidly attached to each other via a compound forming a matrix. This matrix may be obtained from all kinds of organic or inorganic materials, or hybrid materials that are both organic and inorganic.

According to one particular embodiment of the invention, the inorganic material may be a glass or a gel, obtained, for example, from boric acid or borates, silica, silicates, silica gels, alumina, alumina gels, clays or modified clays of zeolites, or from any suitable combination, this list not being limiting.

The organic matrices may be formed from natural, artificial or synthetic macromolecular compounds, for example cellulose, modified celluloses, vinyl polymers, polyvinyl alcohol (PVA), polyamides, polyesters, polyethers, epoxy resins, aromatic polymers such as polyether ketones, polyether sulfones, sulfonated polyether sulfones, polyoxyphenylene, polyphenylene sulfide, fluorinated and perfluorinated polymers (PVDF, PTFE, Teflon®, etc.) and any organic material obtained from the preceding by chemical modification, grafting and/or crosslinking, in order to obtain a matrix with thermomechanical properties suited to the chosen application.

The mass proportion of boron nitride in the material may be between 5% and 100%, for example in the region of 70%, or even 80%, or even 98%. A proportion of 100% or thereabouts refers to a material entirely made of high-temperature-sintered boron nitride powder comprising only a small proportion of possible binder. The material may also be obtained from boron nitride and a binder. The method for preparing the material will be chosen as a function of the properties of the matrix material and of the desired properties.

The material may be formed from boron nitride, for example pulverulent, inserted, especially dispersed, in a polymer membrane, which may afford the material very good proton conductivity. The polymer, for example OVA, may also be used to plug the porosities present in the boron nitride. The addition of the polymer may be performed, for example, under vacuum, using a viscous solution, such that the polymer is sucked into the porosities of the boron nitride, and then stabilized by crosslinking according to a known method. The matrix may also be made from a precursor that is polymerizable under the action of a stimulus, for example by evaporation of one or more solvents, an increase in temperature or by applying gamma radiation, or thermal decomposition of the polymerization initiator.

By way of example, OVA may be used for the matrix, by dissolving this polymer in water at 80° C., and then introducing the boron nitride. A crosslinking agent is then added, for example glutaraldehyde, and a crosslinking catalyst, for example acid, and after pouring and evaporating, the PVA is hot-crosslinked at 40° C. The membrane obtained may preferably be hot-cross linked by being immersed in an acid bath.

A BN membrane in a PVA matrix with a conductivity of $10^{-1}$ S/cm in an electrolyte of 0.5 molar sulfuric acid may thus be obtained.

Additives

The matrix may itself be a proton conductor or, on the other hand, it may not be a proton conductor, or it may contain a proton conductor.

The matrix may comprise a mixture of organic and inorganic compounds.

The matrix may thus comprise one or more of the compounds from the following list, which is not limiting: inorganic compound, for example silica, for example in the form of Aerosil®, amorphous silica gel, silica grafted with organic groups with phosphonic acid or sulfonic acid functions, alumina, zirconia, zirconium hydrogen sulfate, titanium oxide, sulfonated titanium oxide, tungsten trioxide, tungsten trioxide hydrate, phosphomolybdic acid (PMA), tungstophosphoric acid (TPA), molybdophosphoric acid, zeolite charged with heteropolyacid, hole heteropolyacid $H_8SiW_{11}O_{39}$, silicated multilayer nanoparticles, for example montmorillonite, laponite, modified montmorillonite, for example sulfonated montmorillonite, MCM-41, montmorillonite grafted with organic sultones and with perfluorinated sultones, phosphosilicates ($P_2O_5$—$SiO_2$), cellulose-based compounds, this list not being limiting.

The matrix may also contain as proton-conducting organic material, for example: Nafion®, perfluorosulfonic acid, sulfonated polysulfone, sulfonated polystyrene, sulfonated polystyrene-(ethylene-butylene), cardo sulfonated poly(ether ether ketone), polyvinylsulfonic acid, polyamidomethylpropaneacrylosulfonic acid (PAMPS) and copolymers thereof, this list not being limiting.

According to another of its aspects, a subject of the invention is also an extruded film, which itself forms the membrane used. The extrusion may be performed by means of an extruder fitted with a head that leads to the formation of a film at the outlet. The extruded material may be formed of a suspension of activated boron nitride in a viscous solution of a suitable polymer, which can be crosslinked after extrusion. The film obtained may be used in unmodified form or modified. For example, electrodes may be deposited on its surface by screen printing.

According to another of its aspects, a subject of the invention is a proton-exchange membrane for an electrochemical device, especially a fuel cell, an electrolyzer or an accumulator, comprising a layer of the material as defined above and other layers of material suited for the intended use.

The ion-permeable wall may preferably have a water permeability of less than 5% of the mass of the transported ions, for example of the mass of hydrogen produced, in the case where $H_2$ is produced.

The ion-permeable wall may have a zero water permeability, measured under standard temperature and pressure conditions, with water in liquid form, or even in the form of steam, at a temperature of less than 600° C. and a pressure difference across the membrane not exceeding 4 bar.

The total water impermeability of the wall may be particularly useful for hydride-treating water-sensitive metal alloys. During the production and storage of hydrogen, may allow the storage in a cathode (electrode toward which the $H^+$ ions migrate) as a hydridable alloy the atomic and/or molecular hydrogen formed during an electrolysis. Water-mediated corrosion of the hydridable alloy is thus avoided. The hydride-treated material obtained may in turn serve as an anode, by reversing the direction of the current, and provide $H^+$ ions that migrate without water across the membrane containing the activated boron nitride.

On the other hand, the presence of water at the interface of the electrode and the proton-exchange membrane may be beneficial for other systems. Specifically, water containing acid, for example at 0.5 mol, behaves like the continuity of the ion-permeable wall due to its ion-conducting power.

The material of the catalyst may comprise, as a function of the desired properties, a metallic or electrically conductive inorganic material, for example active charcoal or graphite, or any kind of material used in electrochemical devices: noble metals, ruthenium, platinum, divided nickel, silver, cobalt, for example platinum coated with Nafion®, this list not being limiting, making it possible to form the catalytic layers on either side of the membrane in contact with the anode and cathode electrodes.

The anode may be made with any electrically conductive material, for example platinum, graphite, for example deposited on a plate of porous titanium (for example with a porosity of 30% to 50%) onto which is deposited a thin layer of catalysts such as $IrO_2$ or $RuO_2$, a mixture of $RuO_2$ and $IrO_2$ and $TiO_2$, $IrO_2$ and $SnO_2$. The thin layer may have a thickness of between 5 μm and 50 μm, or even between 5 and 20 μm, for example about 10 μm. The amount of catalyst per $cm^2$ may be from about 1 to 10 mg/$cm^2$ and better still between 1 and 3 mg/$cm^2$, or even about 2 mg/$cm^2$.

The cathode may also comprise activated boron nitride and active charcoal or graphite. The cathode may be embedded in a mass of boron nitride. The electrode may comprise, for example, a plate of porous titanium (for example with a porosity of 30 to 50%) containing a thin layer of catalysts such as platinum, palladium or a mixture of platinum, palladium, nickel and cobalt. The thin layer may have a thickness of between 5 μm and 20 μm, for example about 10 μm. The amount of catalyst per $cm^2$ is about 0.1 to 1 mg, or even about 0.5 mg/$cm^2$.

One or other of the catalytic layers may be made in a pulverulent form, being sprayed onto the membrane formed by the boron nitride layer mentioned above. After spraying, this layer may be compressed in a press at a pressure of between 5 and 40 kg/$cm^2$, for example about 20 kg/$cm^2$, at a temperature of between 15° C. and 200° C., for example between 25° C. and 150° C., to improve the adhesion of the electrodes to the membrane. The temperature depends on the nature of the layer, depending, for example, on whether or not it comprises a polymer that is sensitive to the applied maximum temperature.

According to another of its aspects, a subject of the invention is also a cell of a fuel cell, electrolyzer or accumulator comprising:

a cathode, for example a catalytic layer for the cathode, a proton-exchange membrane, for example a catalytic layer for the anode and an anode, at least one from among the cathode with its catalytic layer and the membrane comprising, or even being formed from, the material as defined above, especially the proton-exchange membrane.

The proton-exchange membrane may preferably be non-porous. The proton-exchange membrane will have, for example, zero surface porosity on at least one face. The proton-exchange membrane may preferably be impermeable to hydrogen. The term "impermeable" should be understood as meaning that an amount of hydrogen of less than 2% of the amount produced or used can cross a membrane 150 μm thick.

One or both of the catalytic thin layers of the anode and/or the cathode may comprise, for example, at least one of the compounds from the following list, which is not limiting: platinum, for example in the form of nanograins, boron nitride, especially activated boron nitride as mentioned below, active charcoal, a binder, for example a polymeric compound, for example Nafion®, PVA or PTFE, or a mixture of these components.

The thickness of the proton-exchange membrane may be less than or equal to 1 mm, for example between 50 µm and 300 µm.

The cell may also comprise a support substrate for the proton-exchange membrane. The substrate may be chosen from various inorganic or organic materials that are compatible with the chosen application: for example alumina, zirconia, porous boron nitride and mixtures thereof, this list not being limiting.

The substrate may, for example, comprise a grille, one or more yarns, nano yarns, a foam, a film or a plate, for example a pierced plate. The substrate may comprise, for example, a thin woven, made of a polymer, for example of polyamide, for example of Teflon®.

According to one of its aspects, a subject of the invention is also an electrolyzer comprising a cell as defined above.

The invention may be understood more clearly on reading the detailed description that follows, of a nonlimiting implementation example thereof, and on examining the attached drawing, in which.

In the drawing, the relative proportions of the various components have not always been respected, for the sake of clarity.

Figure 1:
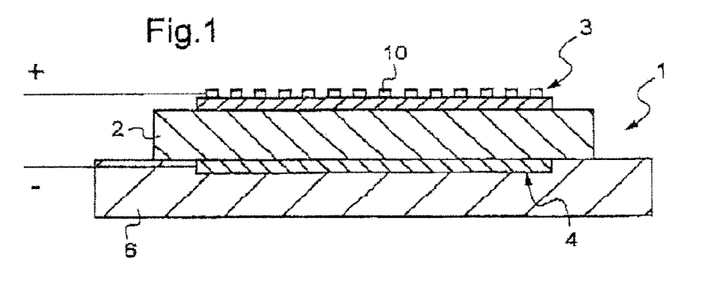
FIG. 1 is a schematic partial view of a fuel cell comprising activated boron nitride in accordance with the invention.

FIG. 1 represents, schematically and partially, a fuel cell 1 comprising a proton-exchange membrane formed from a material comprising a matrix and activated boron nitride contained in this matrix. In the example described, they are grains of activated hexagonal boron nitride h-BN linked via a polymer. The fuel cell 1 comprises an anode 3 on one side of the proton-exchange membrane 2 and a cathode 4 on the other side.

The anode 3 comprises, for example, a layer serving for the oxidation reaction, for example a metallic compound such as platinum or gold, or a composite such as graphite platinum or graphite gold, and the cathode 4 comprises a layer of a catalyst for the reduction reaction, for example a layer of platinum, nickel, graphite nickel, graphite platinum, active-charcoal platinum, active-charcoal platinum PVA or active-charcoal platinum PVA with activated BN, each layer possibly being in contact with the membrane 2.

The proton-exchange membrane 2 and the two layers arranged on either side of it may be supported by a porous substrate 6, for instance a layer of porous titanium acting as a current collector.

Electrical conductors may contact the anode 3 and the cathode 4.

The anode 3 may comprise, for example, on the layer serving for the oxidation reaction, a deposit of gold, for example in the form of a frame 10, so as to harvest the electrical current.

The thickness of the exchange membrane 2 is, for example, 100 µm, and that of the layers serving for the oxidation reaction and as catalyst ranges, for example, from 10 to 50 µm, or even to 30 µm.

In one implementation example of the invention, the proton-exchange membrane 2 is made from an h-BN boron nitride ceramic of reference HIP from the company Saint-Gobain, activated by exposure to sulfuric acid.

The exposure to acid may be performed, for example, for several hours, for example at room temperature or at a higher temperature, for example up to 300° C., the sulfuric acid being, for example, at a concentration of 0.1 M to 18 M, for example 18M. During this exposure, the membrane may where appropriate, be exposed to an electric field of about 30 000 V/m, i.e. a voltage of 3 V when the membrane thickness is 100 µm, which may improve the quality of the activation, for example in the case of exposure to an acid of low molarity. The ceramic is rinsed after the exposure to acid. Without being bound by a theory, the activation may make it possible to modify the side bonds of the boron nitride grains.

When the membrane is activated in the presence of an electric field, this electric field may be generated between two electrodes. The anode may or may not be in contact with the membrane and is in contact with the acidic electrolyte and water. The cathode must be in contact only with the membrane, and not in contact with the acidic electrode and water.

As a variant, the cathode may itself also be immersed in the acid in a cathode compartment. In this case, there are two compartments, an anode compartment and a cathode compartment, separated in leaktight manner by a membrane. Each compartment contains acid and the electrodes are or are not in contact with the membrane.

Figure 4:
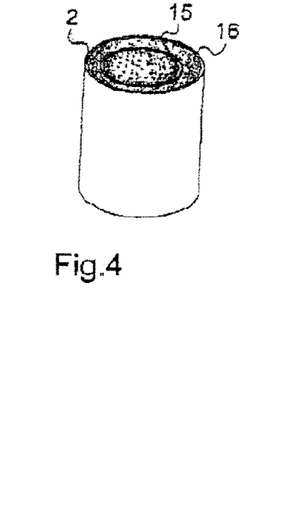
FIG. 4 is a schematic partial perspective view of an activation device.

As another variant, the boron nitride may be deposited in powder form in a crucible 2 in which is also inserted the cathode 15, as illustrated in FIG. 4. The crucible may be made of boron nitride, so as to promote the activation. The assembly is then immersed in the electrolyte.

Figure 5:
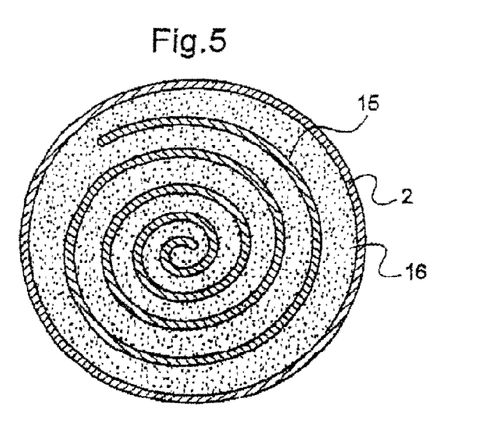
FIG. 5 is a schematic partial top view of one variant of the activation device.

In another variant, the cathode 15 may have a spiral shape, as illustrated in FIG. 5.

The electrodes may be electrodes that serve only for the activation process and that are not useful thereafter, not being present, for example, in the system using the membrane. They may also be electrodes of which one is present in the final system, especially the cathode, for example.

At least one of the electrodes serving for the activation, or even both of them, may be in contact with the membrane and may, for example, be permanently attached thereto. One of the electrodes serving for the activation is, for example, a platinum anode, other electrically conductive components possibly being used, provided that they do not oxidize and do not degrade quickly.

The anode may also be made of porous platinum if it is in contact with the membrane. The other electrode, which is also porous, is a cathode made of a suitable electrically conductive material. These electrodes may be plated, for example via processes of deposition in thin layers, against the membrane.

In one variant, electrically conductive layers are deposited on either side of the boron nitride layer, for example layers of porous titanium containing platinum at the surface. The membrane thus coated is then exposed to the acid to activate it, in the presence of an electric field applied by means of the conductive layers.

Once the exposure to acid has been performed, the membrane may be rinsed.

Needless to say, it does not constitute a departure from the context of the present invention to make modifications to the examples that have just been given above.

It is especially possible to platinum-coat the exchange membrane only on the cathode and to use a porous titanium plate as current collector. It is also possible to coat the exchange membrane only with an alloy of oxides on the anode and to use only a porous titanium plate as current collector.

As another variant, one or both of the electrodes, anode and/or cathode, may be at least partially made of a material comprising a matrix and activated boron nitride contained in the matrix.

The proton-exchange membrane may have various shapes, for example a flat or cylindrical shape.

Figure 2:
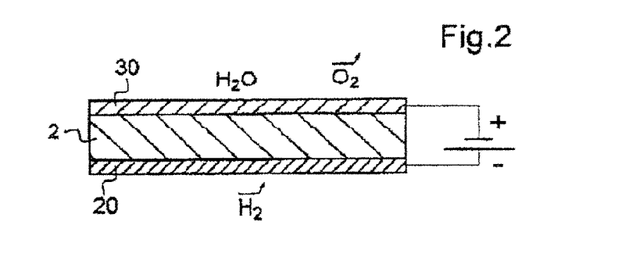
FIG. 2 is a schematic partial view of a proton-exchange membrane for producing an electrolyzer membrane.

In the example of FIG. 2, the proton-exchange membrane 2 is used in an electrolyzer comprising a cathode 20 made of porous titanium surface-coated with platinum, the anode 30 being, for example, porous titanium surface-coated with iridium oxide $IrO_2$.

Figure 3:
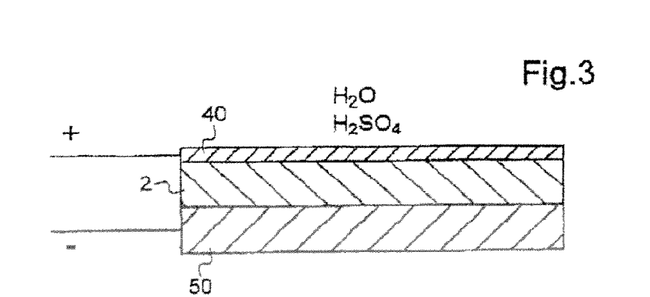
FIG. 3 is a schematic partial view of a proton-exchange membrane for producing an accumulator.

In the example of FIG. 3, the exchange membrane 2 is used in an accumulator, the anode 40 being made, for example, of porous titanium surface-coated with iridium oxide $IrO_2$ and platinum and in contact with an aqueous acidic electrolyte, for example a sulfuric acid solution, while the cathode 50 comprises a hydridable material.

As another variant, at least one of the electrodes, especially the cathode, may be at least partially made of a material in accordance with the invention.

Figure 6:
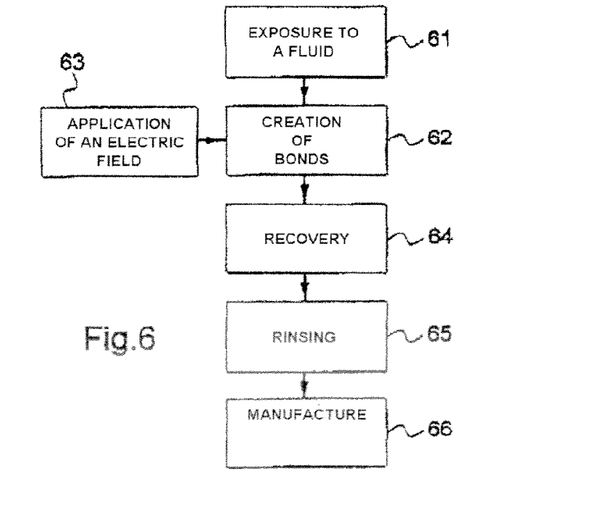
FIG. 6 is a block diagram illustrating the process in accordance with the invention.

An example of an activation process in accordance with the invention will now be described with reference to FIG. 6.

Use is made of boron nitride that may be hexagonal, or even turbostratic hexagonal, and which, in one embodiment of the invention, is in a pulverulent form. The activation mar thereby be facilitated. The boron nitride grains may be percolated. The boron nitride may contain at least one additive that may promote the activation, for example oxygen and boron oxide.

The selected boron nitride is, in a first step 61, exposed to a fluid for providing hydroxyl radicals —OH, for example an acidic or basic solution, or even quite simply water.

Activation of the boron nitride may, for example, be performed as follows.

18 M acid (99.99% pure) may be used. The boron nitride in powder form is formed from polycrystalline grains of variable size, which depends on the manufacturing methods used. Each BN crystal contained in a polycrystalline BN grain is in contact with other crystals at the edge of the leaflet. This crystalline structure may be represented schematically in the form of stacks of leaflets.

In the case of activation of the BN powder with acid, the infrared spectroscopic signature by FTIR spectroscopy (Fourier Transformed Infrared spectroscopy) changes according to the degree of activation.

The pulverulent boron nitride may be placed in crucible that is itself made of boron nitride, so as to ensure the proton conductivity, or in another material.

In a second step 62, bonds are created between the boron nitride and the hydroxyl radicals, especially B—OH bonds, or even optionally bonds with nitrogen atoms of the boron nitride, especially between the protons and the nitrogen atoms of the boron nitride, for example N—H bonds, or even B—$SO_3H$, B—$SO_4H$, N—$SO_3H$ and/or N—$SO_4H$ bonds.

The activation may be promoted by applying an electric field in step 63, for example by means of a cathode and an anode soaked in the solution, one or both of these electrodes possibly being used and subsequently stored for the manufacture of the fuel cell.

The activation may be promoted by increasing the temperature of the boron nitride-acid mixture.

After activation, the activated boron nitride may be recovered in a step 64, and may optionally be rinsed in a step 65 before performing the manufacture of a fuel cell in a step 66.

The boron nitride used may be combined with the matrix, for example a polymer, before the activation, or after the activation and before the manufacture of the fuel cell.

The result of the activation on the boron nitride will now be described with reference to FIGS. 7 and 8.

Figure 7:
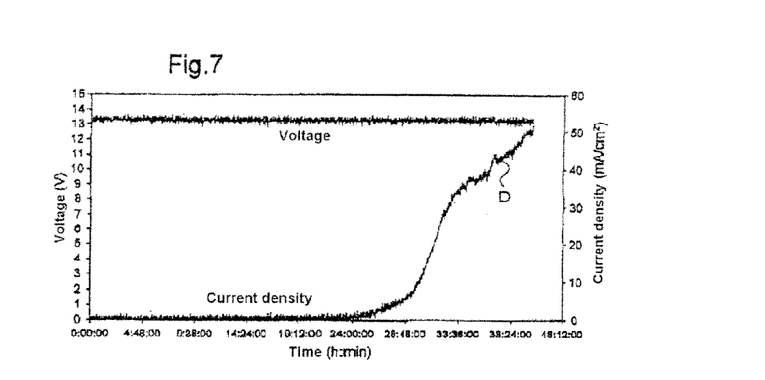
FIG. 7 illustrates the variation in current density during the activation of a membrane in accordance with the invention according to one of the electrochemical activation methods.
Figure 8:
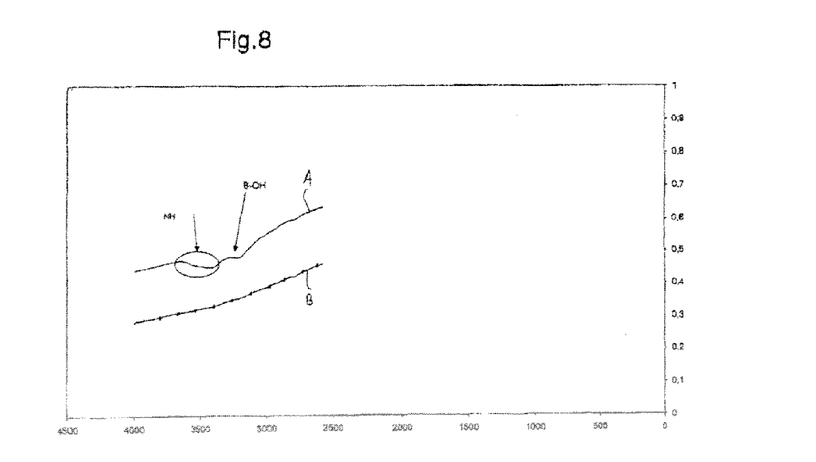
FIG. 8 represents the infrared spectra of activated boron nitride and of raw boron nitride.

FIG. 7 illustrates the change in current density and in voltage during the activation of boron nitride. It is observed that the current density D increases abruptly after a certain time, namely about 30 hours in the example described, which illustrates the fact that proton conduction in the boron nitride does indeed take place.

FIG. 4 illustrates the infrared spectra of activated boron nitride A and of raw boron nitride B, i.e. before activation.

It is found by observing these spectra A and B that they are of different shape. The presence of two troughs in spectrum A that are not present in spectrum B may be noted. These troughs illustrate the presence of B—OH and N—H bonds, which result from the activation of the boron nitride.

The activation of the boron nitride may also be observed by measuring its proton conductivity. Raw, i.e. unactivated, boron nitride may have a proton conductivity of about $10^{-5}$ Siemens/cm, whereas activated boron nitride may have a proton conductivity of about $10^{-2}$ to $10^{-1}$ Siemens/cm, for example $10^{-1}$ Siemens/cm.

For comparative purposes, Nafion® may have a proton conductivity of about $8.6 \times 10^{-2}$ Siemens/cm.

It is possible, for example, to use a boron nitride membrane preparation process with a machine of SPS type (spark plasma sintering). This technique consists in passing a high electric current between two graphite electrodes, which, via the Joule effect, will undergo a rapid and strong increase in temperature. Between the two electrodes is placed a graphite mould containing boron nitride powder, the powder-mould interface being made with paper. When the current is applied, the powder is pressed.

In contrast with the usual press techniques, the SPS technique makes it possible to dispense with the presence of a sintering component, such that the result is thus a pellet formed exclusively from the desired material, in this case boron nitride.

In this example, a commercial HCV boron nitride powder is used. Commercial HCV BN powder allows a pellet to be obtained. After pressing, the pellet is polished to remove the paper remaining at the surface of the sample.

The pellet obtained is analyzed by X-ray diffraction. The diffractogram obtained is presented in FIG. 9 on curve C along with the diffractogram of the commercial HCV powder that has not been subjected to an SPS treatment, on curve D. It may be noted that the pellet shows much higher crystallinity than the untreated HCV powder. Families of planes such as the families (103) or (104) that are not observable for the untreated HCV powder appear on the diffractogram of the pellet. It may also be noted that the line intensities are not in accordance with the standard intensities of a hexagonal boron nitride powder. Such a difference may be explained by the fact that, in the case of the pellet, the grains possibly do not have a totally random orientation as in the case of a powder, thus promoting the diffraction of certain families of planes.

Figure 9:
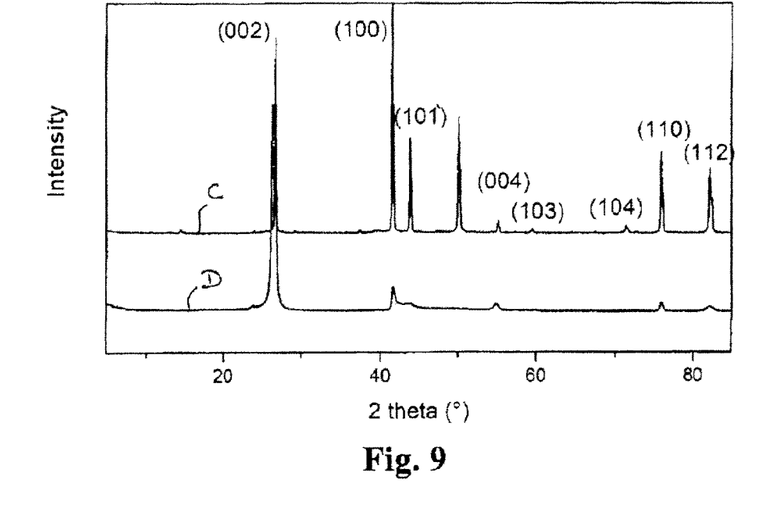
FIG. 9 illustrates the X-ray diffractogram of a pellet of activated boron nitride powder.

Thus, it may be observed in particular that the relative intensities of the lines of the families (104), (110) and (112) are not in accordance with the intensities normally expected for boron nitride of hexagonal crystal structure. Specifically, the lines (110), (112) are too intense relative to the line (104).

Examples of preparation of an activated boron nitride membrane with PVA will now be described.

Among the various polymers proposed, polyvinyl alcohol (PVA) is a cheap biocompatible polymer that has a good capacity to form films, by pouring a solution of PVA (in water or in an organic solvent), with excellent mechanical properties and good chemical stability. It moreover has the advantage of being readily crosslinkable, due to a high number of OH groups, which affords it good mechanical strength in wet medium. The PVA used is supplied by Celanese; it is the grade Celvol E 4/98 (degree of hydrolysis of 98.3 mol %) with a molecular mass of 31 000. Many methods are proposed in the literature for the crosslinking of PVA: we opted for chemical crosslinking with glutaraldehyde in acidic medium [8] A. Martinelli, A. Matic, P. Jacobsson, L. Börjesson, M. A. Navarra, A. Fernicola S. Panero, B. Scrosati, Solid State Ionics, 177, 2431-2435 (2006).

EXAMPLE 1

We manufacture a membrane containing 20 g of activated BN per 10 g of PVA.

70 mL of water and 10 g of PVA are introduced into a 150 mL beaker; the whole is brought to 90° C. and stirred with a paddle stirrer until dissolution of the polymer is complete (about 30 minutes), and then 20 g of activated BN powder are sprinkled in (at 90° C.), with continued stirring, until wetting of the BN is complete.

The solution is cooled to room temperature and 0.2 mL of GA (50% solution) is added with stirring. The solution is divided into two parts. 0.5 mL of sulfuric acid (2 M) is added to the first part.

The final mixture is rapidly poured into Petri dishes (10 cm diameter). Drying is performed in a fume cupboard at room temperature (12 hours). Membrane A is obtained.

Tests were performed in parallel, by pouring the mixture PVA/BN/GA when the membrane is dry (about 12 hours at room temperature or 3 hours in an oven at 60° C.), it is dipped in 2 M $H_2SO_4$ for about 1 hour to give membrane B.

The membranes obtained have thicknesses of 200 to 500 µm. The membrane obtained is not rigid, but it needs to be used hydrated in order to have a soft consistency.

The permeability test with aqueous 0.2% erythrosine solution is in accordance, the liquid does not pass through and does not migrate at the surface for the membranes thus prepared.

The conductivity measurements on the two membranes are as follows:

| | | |
|---|---|---|
| 0.1M KCl | | 25 Ω |
| Membrane A in 0.1M KCl | 10 g BN Thickness 250 µm | 42 Ω |
| Membrane B in 0.1M KCl | 10 g BN Thickness 500 µm | 58 Ω |

It is thus noted that these membranes are conductive.

The scanning electron microscopy examinations show that the cast membranes have different surfaces as a function of the contacts.

The surface dried in the open air is uniform with few visible pores.

The surface dried in contact with glass (Petri dish) has many pores, although each BN grain is coated with PVA and is bonded together by the polymer.

EXAMPLE 2

Another manufacturing method is used to manufacture BN/PVA membranes with a proportion of 35 g of activated BN per 15 g of PVA.

Activation of the BN powder: 35 ml of 18 molar sulfuric acid are added to 35 g of BN powder. 12 hours later, the mixture is rinsed and filtered twice with 500 ml of water each time.

Preparation of the PVA: 10 g of PVA of molecular weight 186 000 (not limiting, other molecular weights may be used) is brought to 80° C. in 140 ml of demineralized water. 10 g of PVA of molecular weight 31 000 (not limiting, other molecular weights may be used) is brought to 80° C. in 70 ml of demineralized water.

Preparation of the membrane "casting" ink (manufacture): a homogeneous mixture of activated BN powder is obtained with PVA 186 000 and 39 g of the solution of PVA 31 000. A PVA crosslinking agent is added to this mixture. In this example, it is 0.7 ml of glutaraldehyde with 7 ml of 1 molar sulfuric acid.

This final mixture allows casting of the membranes, which may be crosslinked under various temperature and humidity conditions. In the case of this example, the membranes were crosslinked at a temperature of 18° C. and 23% humidity.

The characteristics of these membranes are as follows: conductivity in 1 molar acid: $2 \times 10^{-1}$ S/cm.

They are flexible in water.

They are leaktight to hydrogen at a pressure of 1 bar.

Figure 10:
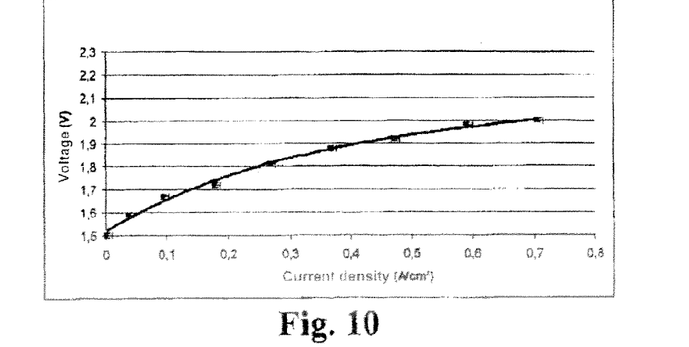
FIGS. 10 and 11 illustrate the characteristic curve of the membranes of examples 2 and 4.

The electrolysis behavior is illustrated in FIG. 10.

To obtain these characteristic curves, we deposited nanostructured catalytic layers of iridium oxide (anode side, 3 mg/cm²) and of platinum (cathode side, 1 mg/cm²) in accordance with the prior art on either side of the membrane.

In the context of using the membrane in a fuel cell, the two catalytic layers are formed from nanostructured platinum.

EXAMPLE 3

Teflon-Coated BN Membrane

One of the techniques for manufacturing carbon electrodes consists in using Teflon as a binder between the carbon grains. This technique is applied to BN in order to obtain membranes than are flexible and more heat-stable than PVA-based membranes.

Proportions of 7 g of BN and 8 g of an aqueous Teflon suspension (60%), i.e. about 5 g of pure Teflon, are used.

The mixture is blended by hand while moistening with water and ethanol until a very supple dough that can be spread using a roll mill is obtained.

In a second series of tests, the amount of Teflon is reduced so as to reduce the hydrophobicity of this membrane. Thus, the formulation is produced with 7 g of activated BN and 3 g of Teflon suspension (i.e. about 2 g of pure Teflon).

The membranes obtained in both cases may have thicknesses of 120 to 250 µm.

The membranes obtained are porous, and the pores are plugged with PVA. The deposition of PVA is then performed using a solution containing 10 g in 70 mL with 0.2 mL of GA (see preceding example).

The membrane is cut to size to be placed in a Büchner funnel, the filtering part of which is covered with a nylon filter, 20 mL of this mixture are poured onto the BN/Teflon membrane, turned over so as to thoroughly wet both faces, and the excess is then removed by filtration under vacuum (water pump). In the following step:
- either the acidic solution is soured into the Büchner funnel, and after 10 minutes of reaction the excess is filtered off and the membrane is dried in a fume cupboard (12 hours),
- or the membrane is removed from the Büchner funnel and immersed in the acidic solution for at least 2 hours, and then dried in the open air.

In both cases, the membranes are extremely supple and fragile, because BN and Teflon are two materials used as lubricants.

The conductivity in 1 M $H_2SO_4$ was measured: it is between 0.1 and 0.2 S/cm.

Better mechanical properties are obtained by incorporating silica into the mixture. Better properties were also obtained by adding a small amount of sulfonated polyether sulfone.

EXAMPLE 4

The example that follows describes the preparation of silica/BN or silica/PESS/BN membranes.

An agate mortar is used.
Quality of the tested silicas:
Merck silica gel—40-63 µm pore 60 Å—reference 9385
standard grade TLC silica gel: 28 850 0-2 to 25 µm—Sigma reference
Lichrosphere 8.7 to 15.4 µm (average 12 µm) pore 60 Å—Merck reference 19654
Davisil grade 633 silica gel—38 to 75 µm pore 60 Å—Sigma reference 236772
Davisil grade 643 silica gel—38 to 75 µm pore 150 Å—Sigma reference 236810
sulfonated polyether sulfone (PESS) ERAS product reference UDEL P3500 (acid form) ion-exchange charge 0.76 meq./monomer unit.
The activated BN must be dry.

BN Silica Membrane

The required amount is weighed out and introduced into a mortar, followed by the required amount of BN.

Intimate mixing is performed using a pestle and a spatula. The PTFE suspension is then introduced into the mixture, and about 2 ml of ethanol (60%) are then deposited.

The whole is mixed in the mortar until an ink and then a soft film has formed.

This film is extracted from the mortar, 1 ml of 60% ethanol is added and the dough is worked manually by folding and stretching using a glass roller until a soft dough is obtained.

This dough is then worked using a roll mill (folding stretching) a maximum of 4 times, taking care to reduce the thickness gradually (150 µm to 200 µm to have a manipulable membrane). The membrane is dried at 40° C. for about 1 hour.

Silica/PESS/BN Membrane

Solutions of PESS in tetrahydrofuran (the solution is slightly cloudy) at 2.5 g/25 ml or 2.5 g/50 ml are prepared in the laboratory.

Preparation silica impregnated with PESS

A known amount of silica is introduced into the mortar, a sufficiently large volume (about 5 to 10 ml/g of $SiO_2$) of PESS solution (choose a concentration as a function of the desired final percentage of PESS) is introduced onto the silica so as to wet it and to form a crumbly dough.

In a fume cupboard, knead it in a mortar until the solvent has evaporated off and a homogeneous, fine, non-agglomerated powder is obtained. Complete the evaporation of the solvent by leaving the powder in an oven at 40° C. for 15 hours.

The required amount of silica/PESS mixture is weighed out and introduced into a mortar, followed by the introduction of the required amount of BN.

Intimate mixing is performed using a pestle and a spatula. The PTFE suspension is then introduced into the mixture, followed by about 2 ml of ethanol (60%).

The whole is mixed in the mortar until an ink and then a soft film has formed.

This film is extracted from the mortar, 1 ml of 60% ethanol is added and the dough is worked manually by folding and stretching using a glass roller until a soft dough of smooth homogeneous appearance is obtained.

This dough is then worked with a roll mill (folding stretching) a maximum of 4 times, taking care to reduce the thickness gradually (to 150 µm to 200 µm to have a manipulable membrane). The membrane is dried at 40° C. for about 1 hour.

Figure 11:
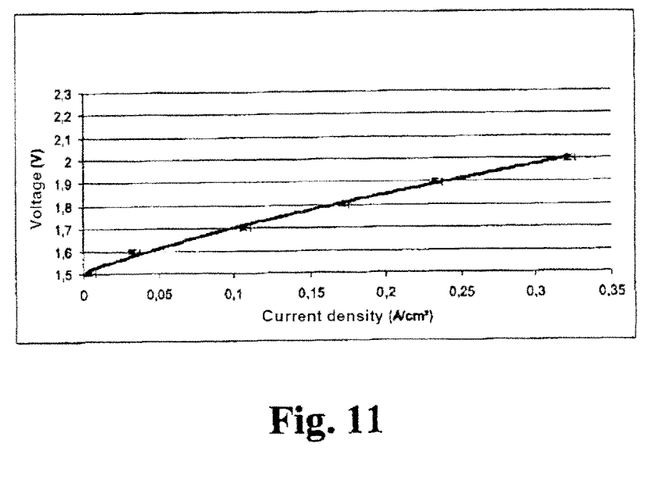

The electrolysis behavior is illustrated in FIG. 11.

Assembly and Determination of the Electrochemical Characteristics of the Membranes All the assemblies were made with membranes with a working area of 2.25 $cm^2$ in an H-TEK cell.

The membrane is moistened by dipping in a 1 M sulfuric acid solution for at least 4 hours before mounting it in the cell. The electrodes are made of E-TEK platinized carbon reference ELT 120EW. The membrane is wetted with a few drops of 1 M sulfuric acid before mounting the electrodes, and a plastic spring maintains the contact between electrode-current collector.

The voltage at the terminals is recorded (fem), during sweeping of the current (zero current up to maximum current for a voltage of 0 mV), and the maximum power is defined (Pmax in mW/$cm^2$) with the corresponding current density (J mA/$cm^2$).

The membrane resistance is measured by impedance measurement.

The first two sweeps are performed, and the cell is then opened, a few drops of acid are again applied to the membrane and the following sweep(s) are performed.

Cell Performance Results

| Ref. | Composition | | Appearance | Thickness | Conductivity in 0.01M $H_2SO_4$ S $cm^{-1}$ | Conductivity in 1M $H_2SO_4$ S $cm^{-1}$ | Cell |
|---|---|---|---|---|---|---|---|
| Matrix 1 | $SiO_2$ | | | | | | |
| Example 4 | $SiO_2$ (25 µm) | 38.5% | Supple, and good elasticity | 248 µm | $1.6 \times 10^{-3}$ | $1.2 \times 10^{-1}$ | Fem (i = 0) 752 mV<br>Pmax: 47.8 mW/$cm^2$<br>J/Pmax: 177.8 mA/$cm^2$<br>Rcell: 1.5 $\Omega cm^2$<br>Leaktightness: OK |
| | BN A29 | 38.5% | | | | | |
| | PTFE | 23.1% | | | | | |
| | Dried 40° C. | | | | | | |
| Control without BN | $SiO_2$ (25 µm) | 66.6% | Supple Difficult to stretch for small thicknesses | 198 | $8.1 \times 10^{-4}$ | $7.2 \times 10^{-2}$ | Fem (i = 0) 776 mV<br>Pmax: 7.5 mW/$cm^2$<br>J/Pmax: 22.2 mA/$cm^2$<br>Rcell: 12.2 $\Omega cm^2$<br>Leaktightness: good |
| | PTFE | 33.3% | | | | | |
| | Dried 1 hour 40° C. | | | | | | |

-continued

| Ref. | Composition | | Appearance | Thickness | Conductivity in 0.01M $H_2SO_4$ S cm$^{-1}$ | Conductivity in 1M $H_2SO_4$ S cm$^{-1}$ | Cell |
|---|---|---|---|---|---|---|---|
| Exmaple 4 | $SiO_2$<br>BN A29<br>PTFE | 23.5%<br>62.5%<br>14.1% | Soft, but elastic, fragile Silica quality 50 μm 150 Å grade 434 | 310 | $1.4 \times 10^{-3}$ | $1.20 \times 10^{-1}$ | Fem (i = 0) 770 mV<br>Pmax: 70.2 mW/cm$^2$<br>J/Pmax: 289 mA/cm$^2$<br>Rcell: 0.6 Ωcm$^2$<br>Leaktightness: good |
| Matrix 1 Contorl without BN | $SiO_2$/PESS<br>$SiO_2$ (25 μm)<br>PESS<br>PTFE<br>Dried 1 hour 40° C. | 55.5%<br>11%<br>33.3% | | 233 μm | $2.08 \times 10^{-4}$ | $0.93 \times 10^{-2}$ | Fem (i = 0) 812 mV<br>Pmax: 7.9 mW/cm$^2$<br>J/Pmax: 22.2 mA/cm$^2$<br>Rcell: 15.7 Ωcm$^2$<br>Leaktightness: good |
| Example 4 | $SiO_2$ 25 μm<br>PESS<br>BN A29<br>PTFE<br>17.5% Dried 1 hour 40° C. | 22.6%<br>4.3%<br>53.8%<br>19.4% | Rigid wavy surface | 208 | $1.25 \times 10^{-3}$ | $0.85 \times 10^{-1}$ | Fem (i = 0) 720 mV<br>Pmax: 9.6 mW/cm$^2$<br>J/Pmax: 44.4 mA/cm$^2$<br>Rcell: 4.4 Ωcm$^2$<br>Leaktightness: good |
| Exmaple 4 | $SiO_2$ 25 μm<br>PESS<br>BN A29<br>PTFE<br>2 mL 95° ethanol | 37.0%<br>1.8%<br>43.7%<br>17.5% | Very supple | 230 μm | $1.4 \times 10^{-3}$ | $1.20 \times 10^{-1}$*<br>*by analogy relative to Rcell | Fem (i = 0) 843 mV<br>Pmax: 44.6 mW/cm$^2$<br>J/Pmax: 200 mA/cm$^2$<br>Rcell: 0.45 Ωcm$^2$<br>Leaktightness: good |
| Matrix 3 Control | PVA<br>PVA (1 g)° + GA<br>10 ml + 2M HCl 1 ml PrOH$_2$ water | 50% | Supple, stable in $H_2SO_4$ | 284 μm | $1.8 \times 10^{-5}$ | | Fem (i = 0) 977 mV<br>Pmax: 8 mW/cm$^2$<br>J/Pmax: 6.7 mA/cm$^2$<br>Leaktightness: good |
| Examples 1 and 2 | PVA 90M<br>act. BN batch 22 + 0.2 ml 5% GA + 0.2 ml 1M H'<br>Dried 2 h30 R.T. | 50%<br>50% | Supple if moisture content > 4% | 500 μm | $3.2 \times 10^{-3}$ | $2.9 \times 10^{-1}$ | Fem (i = 0) 782 mV<br>Pmax: 76.8 mW/cm$^2$<br>J/Pmax: 288.9 mA/cm$^2$<br>Rcell: not measured<br>Leaktightness: good |
| Examples 1 and 2 | PVA 30M<br>186M<br>BN<br>5% GA + 1M H$^-$ | 10%<br>20.4%<br>69.6% | Supple if wet | | $1.6 \times 10^{-3}$ | $1.2 \times 10^{-1}$*<br>*by analogy relative to Rcell | Fem (i = 0) 893 mV<br>Pmax: 52.3 mW/cm$^2$<br>J/Pmax: 222 mA/cm$^2$<br>Rcell: 1.9 Ωcm$^2$<br>Leaktightness: good, membrane sticks to the electrodes |

The tests with membranes without activated BN all lead to high membrane resistances.

The term "comprising one" should, be understood as being synonymous with "comprising at least one".

The invention claimed is:

1. A method of manufacturing a material for an electrochemical device, the method comprising:
   activating a quantity of boron nitride; and
   inserting the activated boron nitride into a matrix such that the activated boron nitride is contained in the matrix, thereby forming the material for an electrochemical device.

2. The method as claimed in claim 1, wherein the activated boron nitride is in the form of percolated grains.

3. The method as claimed in claim 1, wherein the activated boron nitride is in the form of sintered grains.

4. The method as claimed in claim 1, wherein the activated boron nitride is crystallized in a hexagonal form.

5. The method as claimed in claim 1, wherein the activated boron nitride is turbostratic.

6. The method as claimed in claim 1, wherein the matrix is a mineral matrix.

7. The method as claimed in claim 1, wherein the matrix comprises at least one of an organic material and an inorganic material.

8. The method as claimed in claim 1, wherein the activated boron nitride is present in the material in a mass proportion ranging from 5% to 100%.

9. The method of claim 1, further comprising extruding a film from the matrix.

10. A method of manufacturing a proton-exchange membrane comprising a layer of the material manufactured via the method as claimed in claim 1.

11. A method of manufacturing an electrode for an electrochemical device, the electrode being at least partially made of the material manufactured via the method as claimed in claim 1.

12. The method as claimed in claim 8, wherein the activated boron nitride is present in the material in a mass proportion of about 70%.

13. The method as claimed in claim 8, wherein the activated boron nitride is present in the material in a mass proportion of about 80%.

14. The method as claimed in claim 8, wherein the activated boron nitride is present in the material in a mass proportion of about 98%.

* * * * *